(12) United States Patent
Murakami et al.

(10) Patent No.: US 10,038,800 B2
(45) Date of Patent: Jul. 31, 2018

(54) IMAGE FORMING APPARATUS INCLUDING AN ELECTRONICS CONTAINER DESIGNED TO PERMIT AN OVERALL EFFICIENT STRUCTURE

(71) Applicants: Hiroaki Murakami, Kanagawa (JP); Nobuhiro Shima, Kanagawa (JP); Yoshihide Ohta, Kanagawa (JP); Hiroki Ishimitsu, Kanagawa (JP); Kazuyuki Ito, Kanagawa (JP); Katsuhiro Hoshi, Kanagawa (JP); Takayuki Nishi, Kanagawa (JP)

(72) Inventors: Hiroaki Murakami, Kanagawa (JP); Nobuhiro Shima, Kanagawa (JP); Yoshihide Ohta, Kanagawa (JP); Hiroki Ishimitsu, Kanagawa (JP); Kazuyuki Ito, Kanagawa (JP); Katsuhiro Hoshi, Kanagawa (JP); Takayuki Nishi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/226,986

(22) Filed: Aug. 3, 2016

(65) Prior Publication Data
US 2017/0064106 A1    Mar. 2, 2017

(30) Foreign Application Priority Data
Aug. 28, 2015  (JP) .................................. 2015-169514

(51) Int. Cl.
*G03G 15/00* (2006.01)
*H04N 1/00* (2006.01)
(Continued)

(52) U.S. Cl.
CPC ..... *H04N 1/00496* (2013.01); *G03G 15/5016* (2013.01); *G03G 15/80* (2013.01);
(Continued)

(58) Field of Classification Search
CPC ........... G03G 15/5016; G03G 21/1609; G03G 21/1604; G03G 15/6552;
(Continued)

(56) References Cited

U.S. PATENT DOCUMENTS 8,909,085 B2 * 12/2014 Short ................. G03G 15/5016
399/81
2009/0045313 A1 * 2/2009 Huang ............... F16M 11/2014
248/371
(Continued)

FOREIGN PATENT DOCUMENTS

JP       02287561 A  * 11/1990
JP       2003-146522    5/2003
(Continued)

*Primary Examiner* — Robert Beatty
(74) *Attorney, Agent, or Firm* — Harness, Dickey & Pierce, P.L.C.

(57) ABSTRACT

An image forming apparatus includes an outer cover, an interior device spaced apart from the outer cover, and an accommodating recess interposed between the outer cover and the interior device. The accommodating recess accommodates an arbitrary part of the image forming apparatus.

17 Claims, 5 Drawing Sheets

(51) Int. Cl.
*H04N 1/04* (2006.01)
*G03G 21/16* (2006.01)

(52) U.S. Cl.
CPC ..... *G03G 21/1609* (2013.01); *H04N 1/00493* (2013.01); *H04N 1/00527* (2013.01); *H04N 1/00551* (2013.01); *H04N 1/04* (2013.01)

(58) Field of Classification Search
CPC ......... G03G 2215/00421; G03G 15/80; H04N 1/00496; H04N 1/00493; H04N 1/00527; H04N 1/00129; H04N 1/00885; H04N 1/00559
USPC .......................................... 399/81, 107, 405
See application file for complete search history.

(56) References Cited

U.S. PATENT DOCUMENTS

| | | | |
|---|---|---|---|
| 2009/0103251 A1* | 4/2009 | Suzuki | G03G 15/5016 361/679.02 |
| 2011/0019347 A1* | 1/2011 | Imai | G03G 21/1628 361/679.01 |
| 2012/0099132 A1* | 4/2012 | Kurokawa | G03G 21/1619 358/1.13 |
| 2013/0188209 A1* | 7/2013 | Horikawa | H04N 1/00546 358/1.13 |
| 2015/0309469 A1* | 10/2015 | Kusano | G03G 21/1647 399/110 |
| 2016/0161904 A1 | 6/2016 | Matsuda et al. | |
| 2016/0182750 A1* | 6/2016 | Shimazu | H04N 1/00525 358/1.13 |

FOREIGN PATENT DOCUMENTS

| | | | |
|---|---|---|---|
| JP | 2006-349849 | | 12/2006 |
| JP | 2008275688 A | * | 11/2008 |
| JP | 2009-204639 | | 9/2009 |
| JP | 2011101962 A | * | 5/2011 |
| JP | 2011-150266 | | 8/2011 |
| JP | 2012147092 A | * | 8/2012 |
| JP | 2013-038690 | | 2/2013 |
| JP | 2014002210 A | * | 1/2014 |

* cited by examiner

IMAGE FORMING APPARATUS INCLUDING AN ELECTRONICS CONTAINER DESIGNED TO PERMIT AN OVERALL EFFICIENT STRUCTURE

CROSS-REFERENCE TO RELATED APPLICATION

This patent application is based on and claims priority pursuant to 35 U.S.C. § 119 to Japanese Patent Application No. 2015-169514, filed on Aug. 28, 2015, in the Japanese Patent Office, the entire disclosure of which is hereby incorporated by reference herein.

BACKGROUND

Technical Field

Example embodiments generally relate to an image forming apparatus, and more particularly, to an image forming apparatus for forming an image on a recording medium.

Background Art

Related-art image forming apparatuses, such as copiers, facsimile machines, printers, or multifunction printers having two or more of copying, printing, scanning, facsimile, plotter, and other functions, typically form an image on a recording medium according to image data. Thus, for example, a charger uniformly charges a surface of a photoconductor; an optical writer emits a light beam onto the charged surface of the photoconductor to form an electrostatic latent image on the photoconductor according to the image data; a developing device supplies toner to the electrostatic latent image formed on the photoconductor to render the electrostatic latent image visible as a toner image; the toner image is directly transferred from the photoconductor onto a recording medium or is indirectly transferred from the photoconductor onto a recording medium via an intermediate transfer belt; finally, a fixing device applies heat and pressure to the recording medium bearing the toner image to fix the toner image on the recording medium, thus forming the image on the recording medium.

Such image forming apparatus may include an electric box and a control panel. The electric box drives various components incorporated in the image forming apparatus including the above-described components used to form the toner image on the recording medium. The control panel is used by a user to input various instructions for a print job to form the toner image on the recording medium.

SUMMARY

At least one embodiment provides a novel image forming apparatus that includes an outer cover, an interior device spaced apart from the outer cover, and an accommodating recess interposed between the outer cover and the interior device. The accommodating recess accommodates an arbitrary part of the image forming apparatus.

Additional features and advantages of example embodiments will be more fully apparent from the following detailed description, the accompanying drawings, and the associated claims.

BRIEF DESCRIPTION OF THE DRAWINGS

A more complete appreciation of example embodiments and the many attendant advantages thereof will be readily obtained as the same becomes better understood by reference to the following detailed description when considered in connection with the accompanying drawings, wherein.

Figure 1:
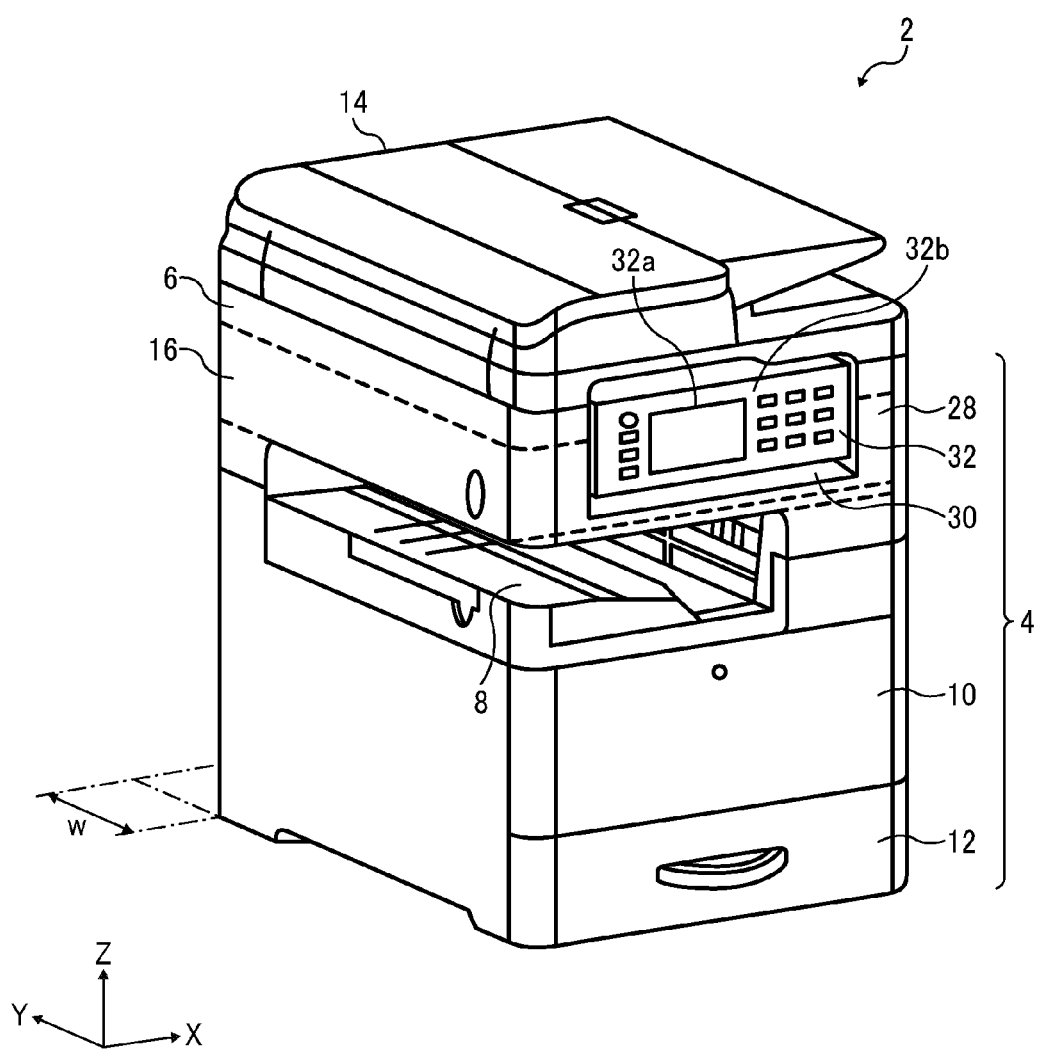
FIG. 1 is an external perspective view of a monochrome image forming apparatus according to an example embodiment of the present disclosure.

The accompanying drawings are intended to depict example embodiments and should not be interpreted to limit the scope thereof. The accompanying drawings are not to be considered as drawn to scale unless explicitly noted.

DETAILED DESCRIPTION

It will be understood that if an element or layer is referred to as being "on", "against", "connected to", or "coupled to" another element or layer, then it can be directly on, against, connected or coupled to the other element or layer, or intervening elements or layers may be present. In contrast, if an element is referred to as being "directly on", "directly connected to", or "directly coupled to" another element or layer, then there are no intervening elements or layers present. Like numbers refer to like elements throughout. As used herein, the term "and/or" includes any and all combinations of one or more of the associated listed items.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, a term such as "below" can encompass both an orientation of above and below. The device may be otherwise oriented (rotated 90 degrees or at other orientations) and the spatially relative descriptors used herein are interpreted accordingly.

Although the terms first, second, and the like may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present disclosure.

The terminology used herein is for the purpose of describing particular embodiments only and is not intended to be limiting of the present disclosure. As used herein, the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the disclosure of this specification is not intended to be limited to the specific terminology so selected and it is to be understood that each specific element includes all technical equivalents that operate in a similar manner.

Referring now to the drawings, wherein like reference numerals designate identical or corresponding parts throughout the several views, particularly to FIG. 1, an image forming apparatus 2 according to an example embodiment is explained.

FIG. 1 is an external perspective view of the image forming apparatus 2. The image forming apparatus 2 may be a copier, a facsimile machine, a printer, a multifunction peripheral or a multifunction printer (MFP) having at least one of copying, printing, scanning, facsimile, and plotter functions, or the like. According to this example embodiment, the image forming apparatus 2 is a monochrome copier that forms a monochrome toner image on a recording medium by electrophotography. Alternatively, the image forming apparatus 2 may be a color copier that forms a color toner image on a recording medium. Yet alternatively, the image forming apparatus 2 may form an image on a recording medium by inkjet printing.

Referring to FIG. 1, a description is provided of a construction of the image forming apparatus 2.

As illustrated in FIG. 1, the image forming apparatus 2 includes an auto document feeder (ADF) 14 and a body 4. The body 4 includes a scanner 6, an electric box 16, an output tray 8, an image forming device 10, and a paper tray 12. The scanner 6 is disposed in an upper portion of the body 4 and serves as an image reader that reads an image on an original. The output tray 8 is disposed in the upper portion of the body 4 and below the scanner 6. The output tray 8 serves as a sheet output portion or a sheet receiver that receives a sheet bearing a toner image that is ejected from the image forming device 10. Below the output tray 8 are the image forming device 10 and the paper tray 12 detachably attached to the body 4. Above the scanner 6 is the ADF 14 serving as an automatic document feeder that automatically feeds the original to the scanner 6.

Alternatively, the image forming apparatus 2 may also serve as a printer in which the image forming device 10 forms a toner image on a sheet according to image data sent from an external device such as a client computer. Yet alternatively, the image forming apparatus 2 may also serve as a facsimile machine.

Figure 2:
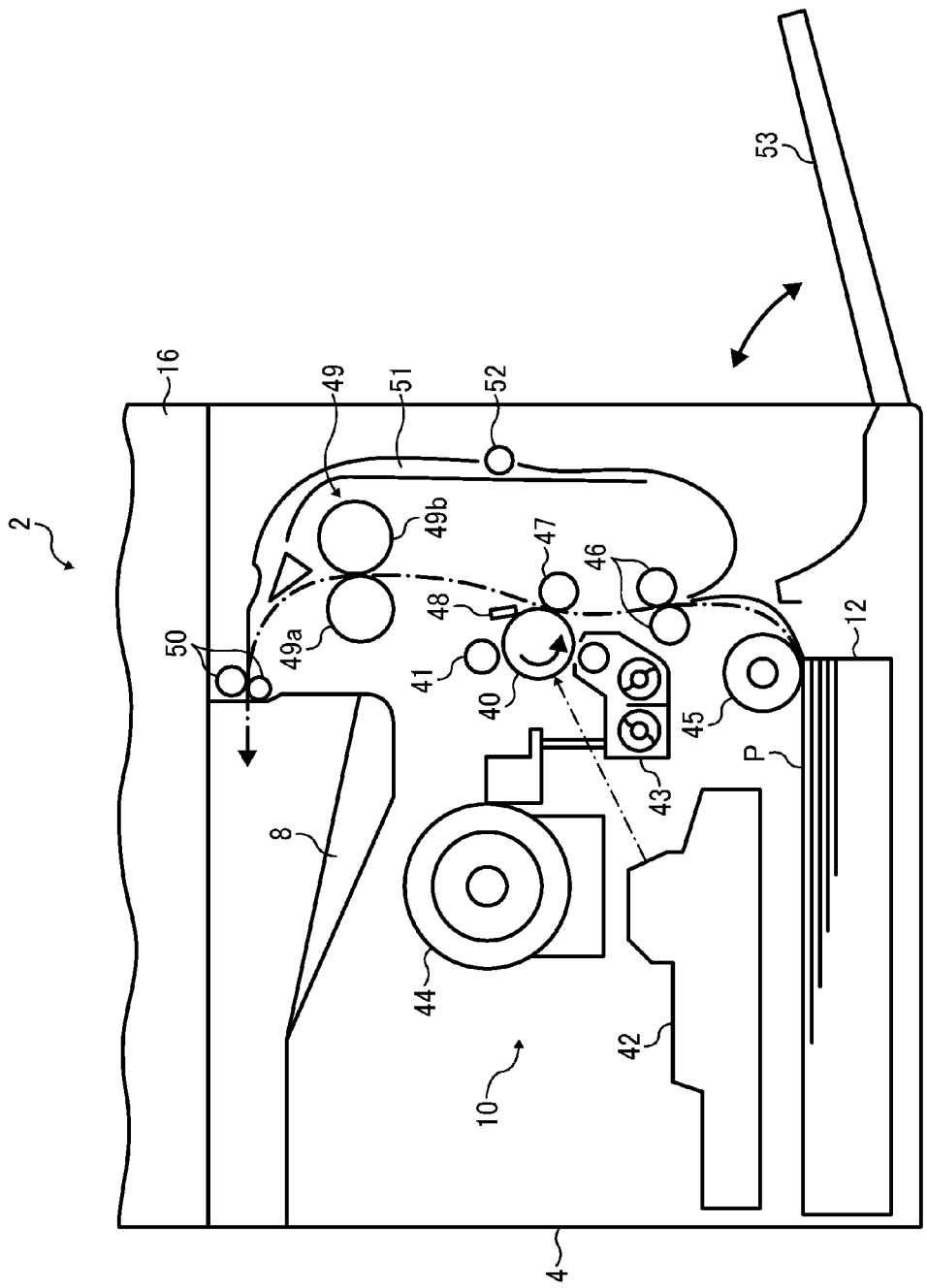
FIG. 2 is a schematic vertical cross-sectional view of the image forming apparatus illustrated in FIG. 1.

Referring to FIG. 2, a description is provided of a construction of the image forming device 10.

FIG. 2 is a schematic vertical cross-sectional view of the image forming apparatus 2. The image forming device 10 includes a photoconductive drum 40 serving as an image bearer. A charger 41 uniformly changes an outer circumferential surface of the photoconductive drum 40. An exposure device 42 forms an electrostatic latent image on the photoconductive drum 40 according to image data. A developing device 43 visualizes the electrostatic latent image formed on the photoconductive drum 40 as a toner image. A feed roller 45 picks up and feeds a sheet P serving as a recording medium from the paper tray 12 to a registration roller pair 46. The registration roller pair 46 conveys the sheet P to a transfer nip formed between the photoconductive drum 40 and a transfer device 47 at a given time when the toner image formed on the photoconductive drum 40 reaches the transfer nip. The transfer device 47 transfers the toner image formed on the photoconductive drum 40 onto the sheet P.

After the transfer of the toner image from the photoconductive drum 40 onto the sheet P, a cleaner 48 removes residual toner and the like failed to be transferred onto the sheet P and therefore remaining on the outer circumferential surface of the photoconductive drum 40 therefrom. A fixing device 49 including a fixing roller 49a heated by a heater and a pressure roller 49b, for example, fixes the toner image on the sheet P. An output roller pair 50 ejects the sheet P bearing the fixed toner image onto the output tray 8.

If a print job requests duplex printing to form a toner image on both sides of the sheet P, the output roller pair 50 rotates reversely to convey the sheet P to a conveyance path 51 such that a trailing edge of the sheet P having been conveyed from the fixing device 49 to the output roller pair 50 becomes a leading edge of the sheet P conveyed from the output roller pair 50 to the conveyance path 51. A conveyance roller 52 conveys the sheet P to the registration roller pair 46 which conveys the sheet P to the transfer nip at a given time when another toner image formed on the photoconductive drum 40 reaches the transfer nip.

A bypass tray 53, which is opened and closed with respect to the body 4, loads one or more sheets P. A toner bottle 44 serves as a toner supply that supplies fresh toner to the developing device 43.

The image forming apparatus 2 depicted in FIG. 2 is a monochrome image forming apparatus that forms a monochrome toner image on a sheet P. Alternatively, the image forming apparatus 2 may be a color image forming apparatus that forms a color toner image on a sheet P as illustrated in FIG. 3.

A description is provided of a construction of an image forming apparatus 2S serving as a color image forming apparatus.

Figure 3:
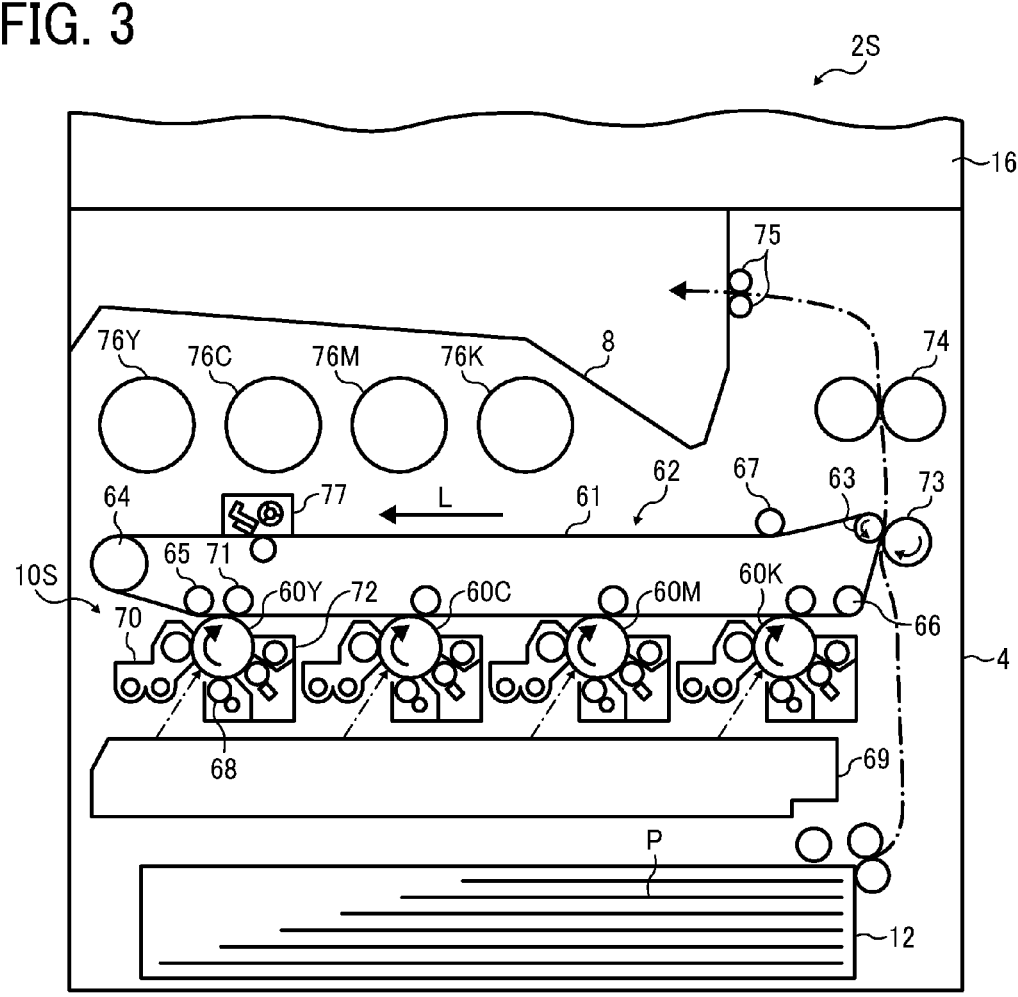
FIG. 3 is a schematic vertical cross-sectional view of a color image forming apparatus according to another example embodiment of the present disclosure.

FIG. 3 is a schematic vertical cross-sectional view of the image forming apparatus 2S. As illustrated in FIG. 3, the image forming apparatus 2S includes a tandem image forming device 10S including four image forming units (e.g., process cartridges) aligned horizontally in FIG. 3. The four image forming units include four photoconductive drums 60Y, 60C, 60M, and 60K serving as image bearers, respectively. Suffixes Y, C, M, and K denote yellow, cyan, magenta, and black, respectively, as colors of a developer used to form a toner image.

An intermediate transfer unit 62 is disposed opposite the photoconductive drums 60Y, 60C, 60M, and 60K of the image forming units, respectively. The intermediate transferor unit 62 includes an intermediate transfer belt 61 (e.g., an endless belt) serving as an intermediate transferor. The intermediate transfer belt 61 is rotatably looped over a plurality of support rollers 63, 64, 65, and 66.

As the support roller 63 serving as a driving roller is driven and rotated counterclockwise in FIG. 3, the intermediate transfer belt 61 is driven and rotated in a rotation direction L. A tension roller 67 presses against an outer circumferential surface of the intermediate transfer belt 61 to exert tension to the intermediate transfer belt 61. The photoconductive drums 60Y, 60C, 60M, and 60K are driven and rotated clockwise in FIG. 3 while the photoconductive drums 60Y, 60C, 60M, and 60K contact the outer circumferential surface of the intermediate transfer belt 61. A charging roller 68 charges the outer circumferential surface of the first photoconductive drum 60Y disposed upstream from the photoconductive drums 60C, 60M, and 60K in the rotation direction L of the intermediate transfer belt 61 at a given polarity. An optical writing unit 69 serving as an exposure device emits an optically modulated laser beam onto the charged outer circumferential surface of the photoconductive drum 60Y. Thus, an electrostatic latent image is formed on the first photoconductive drum 60Y. A developing device 70 visualizes the electrostatic latent image as a yellow toner image. As a primary transfer roller 71 is applied with a transfer voltage, the primary transfer roller 71 primarily transfers the yellow toner image formed on the photoconductive drum 60Y onto the outer circumferential surface of the intermediate transfer belt 61 driven and rotated in the rotation direction L.

After the primary transfer of the yellow toner image from the photoconductive drum 60Y onto the intermediate transfer belt 61, a cleaner 72 removes residual toner failed to be transferred onto the intermediate transfer belt 61 and therefore remaining on the outer circumferential surface of the photoconductive drum 60Y therefrom.

Similarly, cyan, magenta, and black toner images are formed on the second photoconductive drum 60C, the third photoconductive drum 60M, and the fourth photoconductive drum 60K, respectively, and primarily transferred onto the intermediate transfer belt 61 successively such that the cyan, magenta, and black toner images are superimposed on the yellow toner image on the intermediate transfer belt 61. Thus, the yellow, cyan, magenta, and black toner images superimposed on the intermediate transfer belt 61 constitute a color toner image.

The paper tray 12 serving as a sheet feeder is disposed in a lower portion of the body 4. As a registration roller pair rotates, the registration roller pair conveys a sheet P sent from the paper tray 12 to a secondary transfer nip formed between the intermediate transfer belt 61 and a secondary transfer roller 73 at a given time when the color toner image formed on the intermediate transfer belt 61 reaches the secondary transfer nip. The secondary transfer nip is formed between a portion of the intermediate transfer belt 61 that is supported by the support roller 63 and the secondary transfer roller 73 disposed opposite the support roller 63.

As the secondary transfer roller 73 is applied with a transfer voltage, the secondary transfer roller 73 secondarily transfers the yellow, cyan, magenta, and black toner images constituting the color toner image and superimposed on the intermediate transfer belt 61 onto the sheet P collectively. The secondary transfer roller 73 is pressed against the support roller 63 via the intermediate transfer belt 61. The secondary transfer roller 73 is driven and rotated clockwise in FIG. 3 while the secondary transfer roller 73 contacts the outer circumferential surface of the intermediate transfer belt 61.

The sheet P bearing the color toner image is conveyed to a fixing device 74 that fixes the color toner image on the sheet P under heat and pressure. An output roller pair 75 ejects the sheet P conveyed from the fixing device 74 onto the output tray 8 that stacks the sheet P. Toner bottles 76Y, 76C, 76M, and 76K supply fresh yellow, cyan, magenta, and black toners to the developing devices 70, respectively. After the secondary transfer, residual toner failed to be transferred onto the sheet P remains on the intermediate transfer belt 61. The intermediate transfer unit 62 further includes a belt cleaner 77 that removes the residual toner from the intermediate transfer belt 61.

FIG. 3 illustrates the image forming apparatus 2S employing a tandem intermediate transfer method. Alternatively, the image forming apparatus 2S may employ a tandem direct transfer method or a construction in which a plurality of developing devices surrounds a single photoconductive drum.

A description is provided of a construction of a first comparative image forming apparatus.

The first comparative image forming apparatus includes a scanner, an electric box, and a control panel. The scanner reads an image on an original. The electric box accommodates a controller board and a power supply board that drive various units incorporated in the first comparative image forming apparatus. The control panel is used by a user to input various instructions such as the number of prints and the color of a toner image to be formed. The electric box is mounted on a front face of the first comparative image forming apparatus that faces the user who uses the control panel or a rear face of the first comparative image forming apparatus opposite the front face thereof. The electric box extends vertically. The control panel projects beyond the front face of the first comparative image forming apparatus. However, the electric box and the control panel that project beyond the front face of the first comparative image forming apparatus may hinder reduction of a location area where the first comparative image forming apparatus is located.

A description is provided of a construction of a second comparative image forming apparatus.

The second comparative image forming apparatus includes a movable control panel that does not project beyond a front face of the second comparative image forming apparatus. The movable control panel is pivoted upward to expose an output tray to the user so that the user picks up a sheet from the output tray.

However, the movable control panel is interposed between the front face of the second comparative image forming apparatus and a scanner. The front face of the second comparative image forming apparatus is not leveled with a front face of the scanner, degrading the external appearance of the second comparative image forming apparatus.

A description is provided of a construction of a third comparative image forming apparatus incorporating a comparative electric box.

The comparative electric box accommodates a plurality of substrates that controls various electric and electronic parts, such as a motor, a solenoid, and a sensor, situated inside the third comparative image forming apparatus. The plurality of substrates is secured to the comparative electric box with screws and the like. A driving unit incorporates a motor and a gear box that control and drive rollers and belts that constitute a layout of parts used to convey a sheet and form a toner image. The driving unit is mounted on a rear face of a body of the third comparative image forming apparatus. The comparative electric box is mounted on a rear face of the driving unit.

Figure 4:
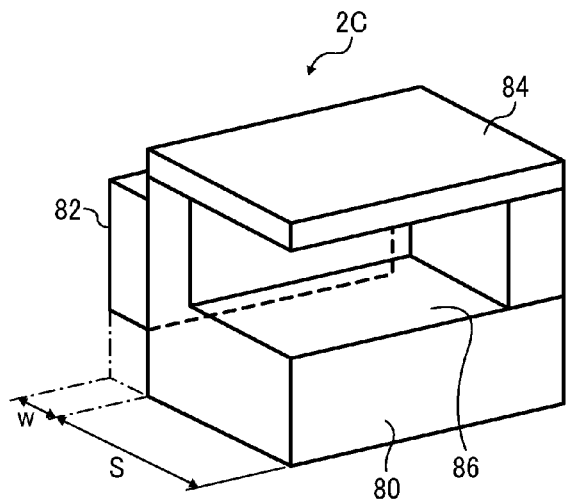
FIG. 4 is a perspective view of a comparative image forming apparatus.

FIG. 4 is a perspective view of a third comparative image forming apparatus 2C. As illustrated in FIG. 4, the third comparative image forming apparatus 2C includes a comparative electric box 82 mounted on a rear face of the third comparative image forming apparatus 2C that is opposite a front cover 80 serving as an operation face facing the user who uses the third comparative image forming apparatus 2C. The comparative electric box 82 extends vertically. Thus, the comparative electric box 82 facilitates assembly and maintenance. The third comparative image forming apparatus 2C further includes a scanner 84 and an output tray 86. The third comparative image forming apparatus 2C has a length S in a depth direction of the third comparative image forming apparatus 2C.

The driving unit and the comparative electric box 82 mounted on the rear face of the driving unit increase a depth of the third comparative image forming apparatus 2C, thus increasing a location area where the third comparative image forming apparatus 2C is located. A length w of the comparative electric box 82 may be decreased in the depth direction of the third comparative image forming apparatus 2C to reduce the location area where the third comparative image forming apparatus 2C is located. However, since the comparative electric box 82 is needed to drive the second comparative image forming apparatus 2C, downsizing of the second comparative image forming apparatus 2C is restricted.

Referring back to FIG. 1, a description is provided of a construction of the image forming apparatus 2 according to an example embodiment.

As illustrated in FIG. 1, a width direction X, a depth direction Y, and a height direction Z of the image forming apparatus 2 define directions seen from the user facing a front face serving as an operation face of the image forming apparatus 2, respectively. The electric box 16 is disposed above the output tray 8 and below the scanner 6. The electric box 16 extends substantially horizontally (e.g., horizontally). Since the electric box 16 is disposed inside an electric box container, the electric box 16 is not visible from an outside of the electric box container.

As illustrated in FIG. 1, the electric box 16 is disposed below the scanner 6 and extended horizontally unlike the comparative electric box 82 mounted on the rear face of the third comparative image forming apparatus 2C as illustrated in FIG. 4. Accordingly, the electric box 16 eliminates the length w in the depth direction Y depicted in FIG. 1 that is equivalent to the length w of the comparative electric box 82 in the depth direction of the third comparative image forming apparatus 2C depicted in FIG. 4. Consequently, the electric box 16 reduces a location area where the image forming apparatus 2 is located substantially.

Compared to the comparative electric box 82 depicted in FIG. 4, the electric box 16 depicted in FIG. 1 increases a height of the image forming apparatus 2 by a height of the electric box 16 in the height direction Z. However, since the electric box 16 extends horizontally, the height of the electric box 16 barely degrades the external appearance and operation of the image forming apparatus 2.

Since the rear face of the third comparative image forming apparatus 2C depicted in FIG. 4 mounts the comparative electric box 82, the center of gravity of the third comparative image forming apparatus 2C is biased. Conversely, the electric box 16 depicted in FIG. 1 extends horizontally, preventing the center of gravity of the image forming apparatus 2 from being biased.

Figure 5:
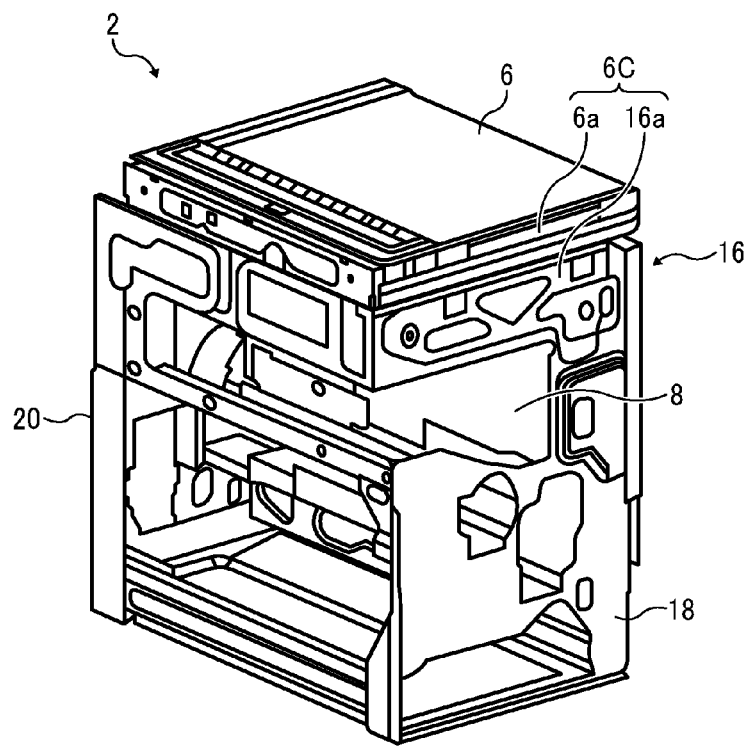
FIG. 5 is a perspective view of a frame of the image forming apparatus depicted in FIG. 1.
Figure 6:
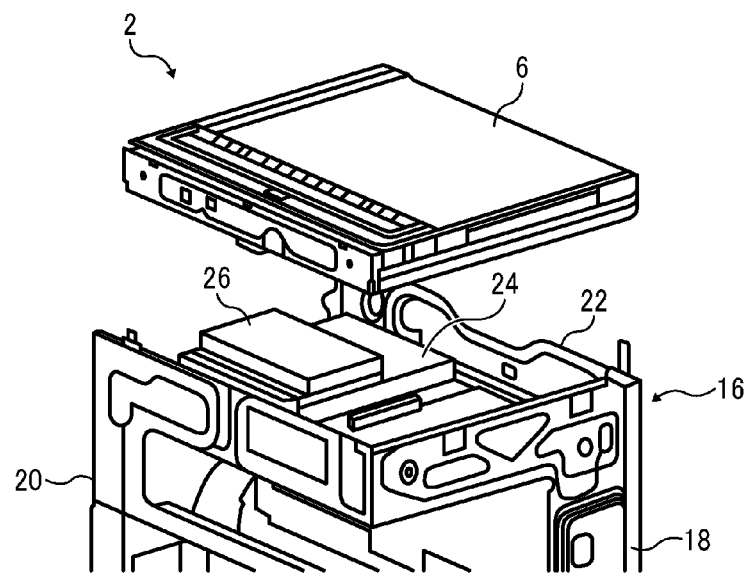
FIG. 6 is a partial perspective view of the frame of the image forming apparatus depicted in FIG. 5.

FIG. 5 is a perspective view of a frame of the image forming apparatus 2, eliminating components disposed inside the image forming apparatus 2. As illustrated in FIG. 5, the image forming apparatus 2 further includes a front plate 18 and a rear plate 20 opposite the front plate 18. The user faces the front plate 18 while the user operates the image forming apparatus 2. FIG. 6 is a partial perspective view of the frame of the image forming apparatus 2. As illustrated in FIG. 6, the electric box 16 includes an electric cabinet 22 contoured into a box and a plurality of electrical components 24 and 26 disposed inside the electric cabinet 22.

The electrical components 24 and 26 include a controller board that drives the scanner 6 and the image forming apparatus 2. The electric cabinet 22 is made of a sheet metal that blocks an electric wave generated by the controller board and the like to shield an outside of the electric box 16 from the electric wave. Thus, the electric cabinet 22 prevents the electric wave from adversely affecting the scanner 6 and the like.

As illustrated in FIG. 6, the scanner 6 is detachably attached to the electric box 16. If the controller board incorporated in the electric box 16 suffers from failure, the controller board is removed for repair or replacement. A service engineer accesses an interior of the electric box 16 to install an optional board. To address those circumstances, the scanner 6 is detachable from the image forming apparatus 2 to allow the service engineer to access the electric box 16 readily.

As illustrated in FIG. 5, the electric box 16 is disposed between the output tray 8 and the scanner 6 in the height direction Z of the image forming apparatus 2, increasing the height of the image forming apparatus 2 by the height of the electric box 16. A combined face 6C constructed of a front face 16a of the electric box 16 and a front face 6a of the scanner 6 depicted in FIG. 5 is secluded or spaced apart from an outer cover 28, that is, the front face, of the image forming apparatus 2 depicted in FIG. 1, producing a space between the combined face 6C and the outer cover 28 of the image forming apparatus 2.

For example, a projection area of each of the scanner 6 and the electric box 16 occupies a relatively small area against a projection area of the image forming apparatus 2 projected in the height direction Z thereof. Hence, the combined face 6C of the electric box 16 and the scanner 6 is recessed from the outer cover 28 of the image forming apparatus 2 in the depth direction Y.

As illustrated in FIG. 1, according to this example embodiment, the image forming apparatus 2 includes an accommodating recess 30 being recessed from the outer cover 28 of the image forming apparatus 2 and accommodating an arbitrary part or an arbitrary component of the image forming apparatus 2. In other words, the electric box 16 is disposed below the scanner 6 and extended horizontally to reduce the location area where the image forming apparatus 2 is located, thus supplementarily producing a space defined by the width direction X, the depth direction Y, and the height direction Z of the image forming apparatus 2. The space is used as the accommodating recess 30 that accommodates the arbitrary part or the arbitrary component of the image forming apparatus 2.

The third comparative image forming apparatus 2C depicted in FIG. 4 includes a control panel disposed in proximity to the output tray 86 and the scanner 84. The user inputs an instruction for a print job with the control panel. The control panel, according to the size thereof, may project beyond the front cover 80, that is, an outer face, of the third comparative image forming apparatus 2C, increasing the location area where the third comparative image forming apparatus 2C is located. Additionally, the control panel projecting beyond the planar front cover 80 of the third comparative image forming apparatus 2C may produce an exterior of the third comparative image forming apparatus 2C that looks like a part of the front cover 80 which projects therefrom, degrading the external appearance of the third comparative image forming apparatus 2C. To address this circumstance, according to this example embodiment, the accommodating recess 30 accommodates a control panel 32 as illustrated in FIG. 1.

As illustrated in FIG. 1, the outer cover 28 serving as a front face of the body 4 adjoins the accommodating recess 30 that accommodates the control panel 32. The control panel 32 includes a display panel 32a (e.g., a liquid crystal display). While the user does not use the control panel 32, a front face 32b of the control panel 32 is leveled with the outer cover 28 to define an identical plane, preventing the control panel 32 from projecting beyond the outer cover 28 and therefore reducing the location area where the image forming apparatus 2 is located. Additionally, the control panel 32 cased by the accommodating recess 30 suppresses degradation in the external appearance of the image forming apparatus 2. According to this example embodiment, the outer cover 28, that is, the front face of the image forming apparatus 2, serving as the operation face facing the user constitutes one face of the body 4.

Figure 7A:
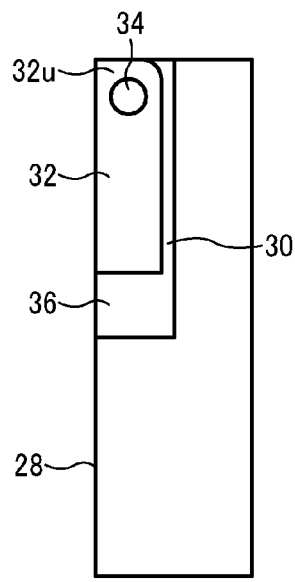
FIG. 7A is a cross-sectional view of an outer cover, an accommodating recess, and a control panel incorporated in the image forming apparatus depicted in FIG. 1, illustrating the control panel placed inside the accommodating recess.

FIG. 7A is a cross-sectional view of the outer cover 28, the accommodating recess 30, and the control panel 32, illustrating the control panel 32 placed inside the accommodating recess 30. As illustrated in FIG. 7A, the control panel 32 is supported by a shaft 34 disposed inside the accommodating recess 30 and mounted on an upper portion 32u of the control panel 32 such that the control panel 32 is pivotable about the shaft 34. Below the control panel 32 is a clearance 36 disposed inside the accommodating recess 30. Thus, the control panel 32 placed inside the accommodating recess 30 defines the clearance 36. The clearance 36 allows the user to insert a finger into the accommodating recess 30 so that the user pivots the control panel 32 readily. For example, as the user puts the finger into the clearance 36, the user lifts and lowers the control panel 32 readily. Thus, the clearance 36 serves as a grip used to move the control panel 32.

Figure 7B:
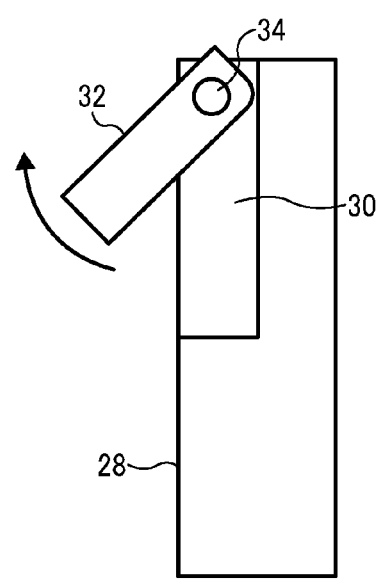
FIG. 7B is a cross-sectional view of the outer cover, the accommodating recess, and the control panel depicted in FIG. 7A, illustrating the control panel pivoted upward.

FIG. 7B is a cross-sectional view of the outer cover 28, the accommodating recess 30, and the control panel 32, illustrating the control panel 32 pivoted upward. As illustrated in FIG. 7B, before the user uses the control panel 32, the user puts the finger into the clearance 36 to touch a lower portion of the control panel 32 and lifts the control panel 32. For example, the control panel 32 and the accommodating recess 30 relatively create a male-female fitting to place the control panel 32 by snap-fit at a given angle at which the user uses the control panel 32 properly. The control panel 32 may be pivoted by 90 degrees from a retracted position illustrated in FIG. 7A to an operation position where the control panel 32 extends horizontally to allow the user to use the control panel 32.

Figure 8:
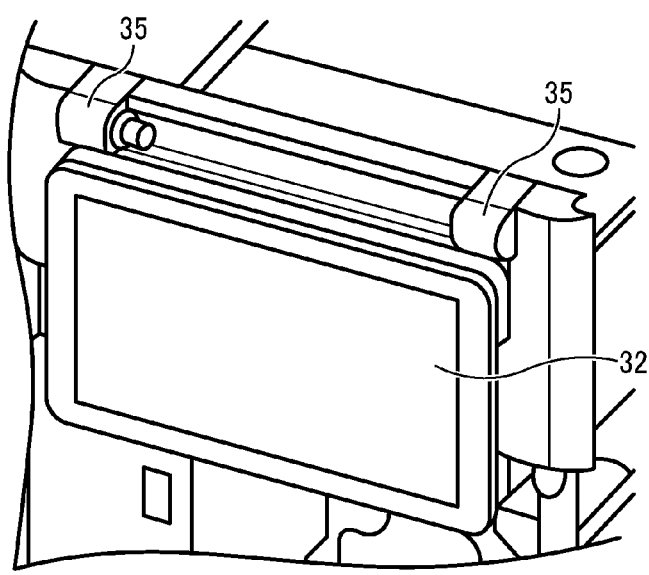
FIG. 8 is a perspective view of the control panel and a hinge supporting the control panel as a variation of the control panel depicted in FIGS. 7A and 7B.

A hinge 35 disposed inside the accommodating recess 30 may support the control panel 32 as illustrated in FIG. 8. FIG. 8 is a perspective view of the control panel 32 and the hinge 35. As illustrated in FIG. 8, if the control panel 32 has an increased size, the hinge 35 supports each lateral end of the control panel 32 in a width direction thereof, improving stable pivot of the control panel 32. If the hinge 35 is situated above the control panel 32, the hinge 35 may come into contact with or project toward the scanner 6 depicted in FIG. 1 or the lower portion of the control panel 32 may come into contact with or project toward the output tray 8, degrading access by the user to the original placed on the scanner 6 or the sheet placed on the output tray 8. To address this circumstance, the hinge 35 is situated within the accommodating recess 30 that absorbs a height of the hinge 35, preventing the control panel 32 from projecting toward the scanner 6 and the output tray 8.

According to this example embodiment, the accommodating recess 30 accommodates the control panel 32. Alternatively, the accommodating recess 30 may accommodate other parts of the image forming apparatus 2.

The present disclosure is not limited to the details of the example embodiments described above and various modifications and improvements are possible. The advantages achieved by the example embodiments described above are examples and therefore are not limited to those described above.

A description is provided of advantages of the image forming apparatuses 2 and 2S.

As illustrated in FIGS. 1 and 3, an image forming apparatus (e.g., the image forming apparatuses 2 and 2S) includes a body (e.g., the body 4) that accommodates a scanner (e.g., the scanner 6), a sheet receiver (e.g., the output tray 8), and an electric box (e.g., the electric box 16). The scanner is disposed in an upper portion of the body. The sheet receiver is disposed below the scanner. The electric box is disposed above the sheet receiver and below the scanner and extended horizontally with respect to the scanner. At least one of the scanner and the electric box constitutes an interior device disposed inside the image forming apparatus and spaced apart from an outer cover (e.g., the outer cover 28). An accommodating recess (e.g., the accommodating recess 30) is interposed between the outer cover and the interior device and recessed from the outer cover. The accommodating recess accommodates an arbitrary component including an arbitrary part of the image forming apparatus.

Accordingly, the image forming apparatus reduces a location area where the image forming apparatus is located and suppresses degradation in the external appearance of the image forming apparatus.

The present disclosure has been described above with reference to specific example embodiments. Note that the present disclosure is not limited to the details of the embodiments described above, but various modifications and enhancements are possible without departing from the spirit and scope of the disclosure. It is therefore to be understood that the present disclosure may be practiced otherwise than as specifically described herein. For example, elements and/or features of different illustrative example embodiments may be combined with each other and/or substituted for each other within the scope of the present disclosure.

What is claimed is:

1. The image forming apparatus, comprising:
an outer cover;
an interior cavity, the outer cover surrounding the interior cavity;
a scanner, disposed within the interior cavity, to read an image on an original;
image forming components disposed within the interior cavity, to form the read image on a medium;
a sheet receiver, disposed below the scanner and above the image forming components in a first vertical direction, to receive a sheet including the formed image; and
an electronics container, disposed within the interior cavity, the electronics container being disposed between the sheet receiver and the scanner in the first vertical direction,
the outer cover, including an accommodating recess in at least a portion of the outer cover to accommodate a control panel disposed on an entire span of a front face of the accommodating recess of the outer cover, wherein the scanner includes a front face to face a user of the image forming apparatus, wherein the electronics container includes a front face to face the user, and wherein the front face of the scanner and the front face of the electronics container are spaced apart from the outer cover to define the accommodating recess.

2. The image forming apparatus according to claim 1, wherein the outer cover includes a front face to face a user of the image forming apparatus.

3. The image forming apparatus according to claim 1, further comprising:

a hinge, disposed in the accommodating recess and pivotably supporting the control panel.

4. The image forming apparatus according to claim 3, wherein the control panel, when placed in the accommodating recess, defines a clearance into which an object is insertable to pivot the control panel.

5. The image forming apparatus according to claim 1, further comprising:

a shaft, disposed in the accommodating recess, to pivotably support the control panel.

6. The image forming apparatus according to claim 5, wherein the control panel includes an upper portion to mount the shaft.

7. The image forming apparatus according to claim 1, wherein the control panel includes a front face leveled with the outer cover to define an identical plane.

8. The image forming apparatus according to claim 1, wherein the-electronics container extends substantially horizontally with respect to the scanner.

9. An image forming apparatus comprising:

an outer cover;

an interior cavity, the outer cover surrounding the interior cavity;

a scanner, disposed within the interior cavity, to read an image on an original;

image forming components disposed within the interior cavity, to form the image on a medium;

an output tray to receive and output the medium including the image, the output tray being disposed below the scanner and above the image forming components in a first vertical direction; and an electronics container, disposed within the interior cavity and housing at least one processor to control the image forming components, the electronics container being disposed between the output tray and the scanner in the first vertical direction, the scanner and electronics container being relatively shorter than a document feeder, disposed above the scanner, in a second horizontal direction, the outer cover, including an accommodating recess in at least a portion of the outer cover-to accommodate a control panel of the image forming apparatus.

10. The image forming apparatus according to claim 9, wherein the outer cover includes a front face to face a user of the image forming apparatus.

11. The image forming apparatus according to claim 9, further comprising:

a hinge, disposed in the accommodating recess and pivotably supporting the control panel.

12. The image forming apparatus according to claim 11, wherein the control panel, when placed in the accommodating recess, defines a clearance into which an object is insertable to pivot the control panel.

13. The image forming apparatus according to claim 9, further comprising:

a shaft, disposed in the accommodating recess, to pivotably support the control panel.

14. The image forming apparatus according to claim 13, wherein the control panel includes an upper portion to mount the shaft.

15. The image forming apparatus according to claim 13, wherein the control panel includes a front face leveled with the outer cover to define an identical plane.

16. The image forming apparatus according to claim 9, further comprising:

a body including a sheet receiver, disposed below the scanner, to receive a sheet, wherein the electronics container is disposed above the sheet receiver and below the scanner.

17. The image forming apparatus according to claim 9, wherein the scanner includes a front face to face a user of the image forming apparatus, wherein the electronics container includes a front face to face the user, and wherein the front face of the scanner and the front face of the electronics container are spaced apart from the outer cover to define the accommodating recess.

* * * * *